United States Patent
Ishikawa

(10) Patent No.: US 10,183,248 B2
(45) Date of Patent: Jan. 22, 2019

(54) AIR CLEANER

(71) Applicant: TOYOTA BOSHOKU KABUSHIKI KAISHA, Aichi-ken (JP)

(72) Inventor: Takao Ishikawa, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 114 days.

(21) Appl. No.: 15/364,718

(22) Filed: Nov. 30, 2016

(65) Prior Publication Data

US 2017/0165600 A1    Jun. 15, 2017

(30) Foreign Application Priority Data

Dec. 14, 2015   (JP) .................................. 2015-243475

(51) Int. Cl.
*B01D 46/00* (2006.01)
*B01D 46/10* (2006.01)

(52) U.S. Cl.
CPC ..... *B01D 46/0006* (2013.01); *B01D 46/0005* (2013.01); *B01D 46/10* (2013.01)

(58) Field of Classification Search
CPC .... B01D 46/00; B01D 46/10; B01D 46/0006; B01D 46/521; B01D 2265/025
USPC ......... 55/481, 478, 479, 480, 490, 492, 493, 55/495, 502, 504, 506, 529, 385.3, 508; 95/273–287; 123/198 E
See application file for complete search history.

(56) References Cited

U.S. PATENT DOCUMENTS

| | | | | |
|---|---|---|---|---|
| 5,679,121 A | * | 10/1997 | Kim | F24F 1/022 55/481 |
| 5,900,032 A | * | 5/1999 | Wang | B01D 46/10 55/385.3 |
| 6,126,708 A | * | 10/2000 | Mack | B01D 46/0005 55/492 |
| 6,231,630 B1 | * | 5/2001 | Ernst | B01D 46/0005 55/385.3 |

(Continued)

FOREIGN PATENT DOCUMENTS

| | | |
|---|---|---|
| DE | 112007002845 | 3/2016 |
| JP | 2008-223485 | 9/2008 |

OTHER PUBLICATIONS

German Office Action in counterpart Application No. 102016123915.1, dated Jul. 2, 2018 (with English-language translation).

*Primary Examiner* — Duane Smith
*Assistant Examiner* — Minh Chau T Pham
(74) *Attorney, Agent, or Firm* — Greenblum & Bernstein, P.L.C.

(57) ABSTRACT

An air cleaner includes a housing having an opening and a filter assembly. The filter assembly is installed in and removed from the housing through the opening. When the filter assembly is at an installation position, a sealing portion of a filter element is pressed against a sealing surface of the housing. The frame includes a frame body, which supports the filter element, and a front engaging portion, which projects further forward in the insertion direction than the frame body. The housing includes a projection, which is engaged with the front engaging portion during insertion of the filter assembly. The front engaging portion and the projection are engaged with each other to constitute a guiding structure that guides the filter assembly toward the installation position.

8 Claims, 6 Drawing Sheets

(56) References Cited

U.S. PATENT DOCUMENTS

| | | | |
|---|---|---|---|
| 6,708,217 B1 * | 3/2004 | Colson | H04L 67/2823 709/203 |
| 6,808,547 B2 * | 10/2004 | Ota | B01D 46/0006 55/478 |
| 7,294,161 B2 * | 11/2007 | Connor | B01D 46/0005 210/DIG. 17 |
| 7,323,027 B1 * | 1/2008 | Fu | B01D 46/0005 55/385.6 |
| 7,351,270 B2 * | 4/2008 | Engelland | B01D 46/0004 123/198 E |
| 8,597,390 B2 * | 12/2013 | Aizawa | B01D 46/0006 55/481 |
| 2004/0020177 A1 | 2/2004 | Ota et al. | |
| 2008/0110146 A1 * | 5/2008 | Germain | B01D 46/0005 55/385.3 |
| 2008/0148695 A1 | 6/2008 | Terres et al. | |
| 2008/0216455 A1 * | 9/2008 | Aizawa | B01D 46/0006 55/481 |

* cited by examiner

AIR CLEANER

BACKGROUND OF THE INVENTION

The present invention relates to an air cleaner that includes a housing, which has an opening, and a filter assembly, which has a filter element and a frame for supporting the filter element. Specifically, the present invention relates to an air cleaner in which the filter is attached to and removed from the housing through the opening.

Conventionally, a type of air cleaner has been known that allows a filter assembly to be installed or removed through an opening of the housing without disassembling the housing (Japanese Laid-Open Patent Publication No. 2008-223485). When the filter assembly is installed in the housing (that is, at an installation position), the sealing portion of the filter element is pressed against the sealing surface of the housing. The air cleaner of the publication has two guide surfaces, which are provided in the housing and extend in the insertion direction of the filter assembly. The guide surfaces have inclined portions, which are inclined to be closer to the sealing surface toward the leading end in the insertion direction. The frame, which supports the filter element, has engaging projections on the side opposite to the sealing portion. The engaging projections are engaged with the guide surfaces. When the filter assembly is inserted into the housing, the engaging projections of the frame are engaged with the guide surfaces of the housing, so that the filter assembly is guided to the installation position along the guide surfaces.

In the air cleaner of Japanese Laid-Open Patent Publication No. 2008-223485, the engaging projections are provided on the side of the frame opposite to the sealing surface. Thus, to insert the filter assembly into the housing through the opening of the housing, the width of the opening needs to be large enough to conform to the projecting dimension of the engaging projections. This unfavorably increases the size of the entire housing. To avoid increase in size of the housing, for example, the diameter of the inlet needs to be reduced to ensure a large width of the opening. This increases the design constraints.

SUMMARY OF THE INVENTION

Accordingly, it is an objective of the present invention to provide an air cleaner that restrains increase in width of the opening of the housing.

To achieve the foregoing objective and in accordance with one aspect of the present invention, an air cleaner is provided that includes a housing having an opening and a filter assembly having a filter element and a frame, which supports the filter element. The filter assembly is installed in and removed from the housing of the air cleaner through the opening. When the filter assembly is at an installation position, a sealing portion of the filter element is pressed against a sealing surface of the housing. A direction along the sealing surface, in which the filter assembly is inserted into the housing through the opening, is defined as an insertion direction. The frame includes a frame body, which supports the filter element and an engaging portion, which projects further forward in the insertion direction than the frame body. The housing includes an engagement portion, which is engaged with the engaging portion during insertion of the filter assembly. The engaging portion and the engagement portion are engaged with each other to constitute a guiding structure that guides the filter assembly toward the installation position.

DETAILED DESCRIPTION OF THE PREFERRED EMBODIMENTS

One embodiment will now be described with reference to FIGS. 1 to 6.

Figure 1:
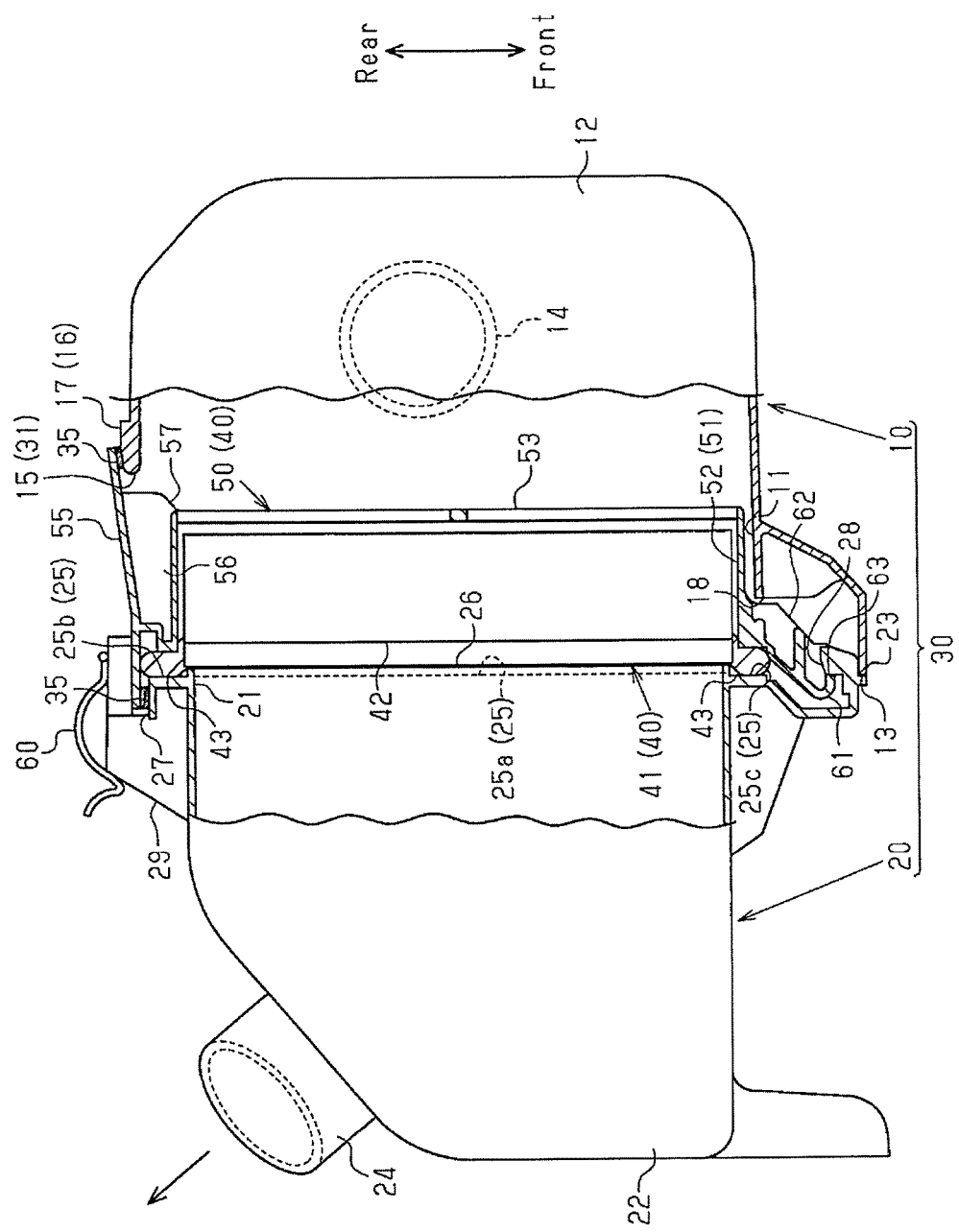
FIG. 1 is a partial cross-sectional plan view illustrating an air cleaner according to one embodiment.
Figure 2:
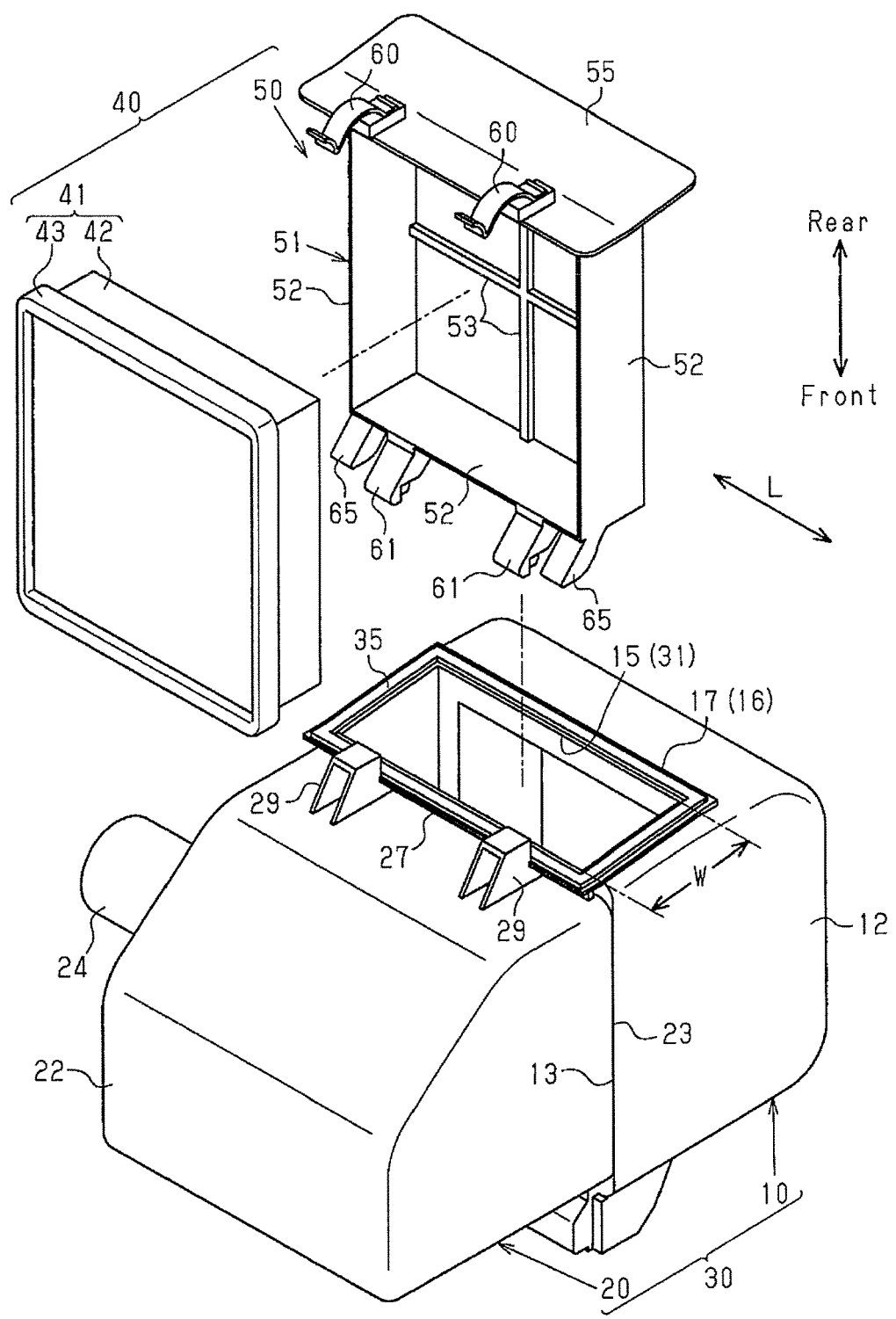
FIG. 2 is an exploded perspective view illustrating the air cleaner.
Figure 4:
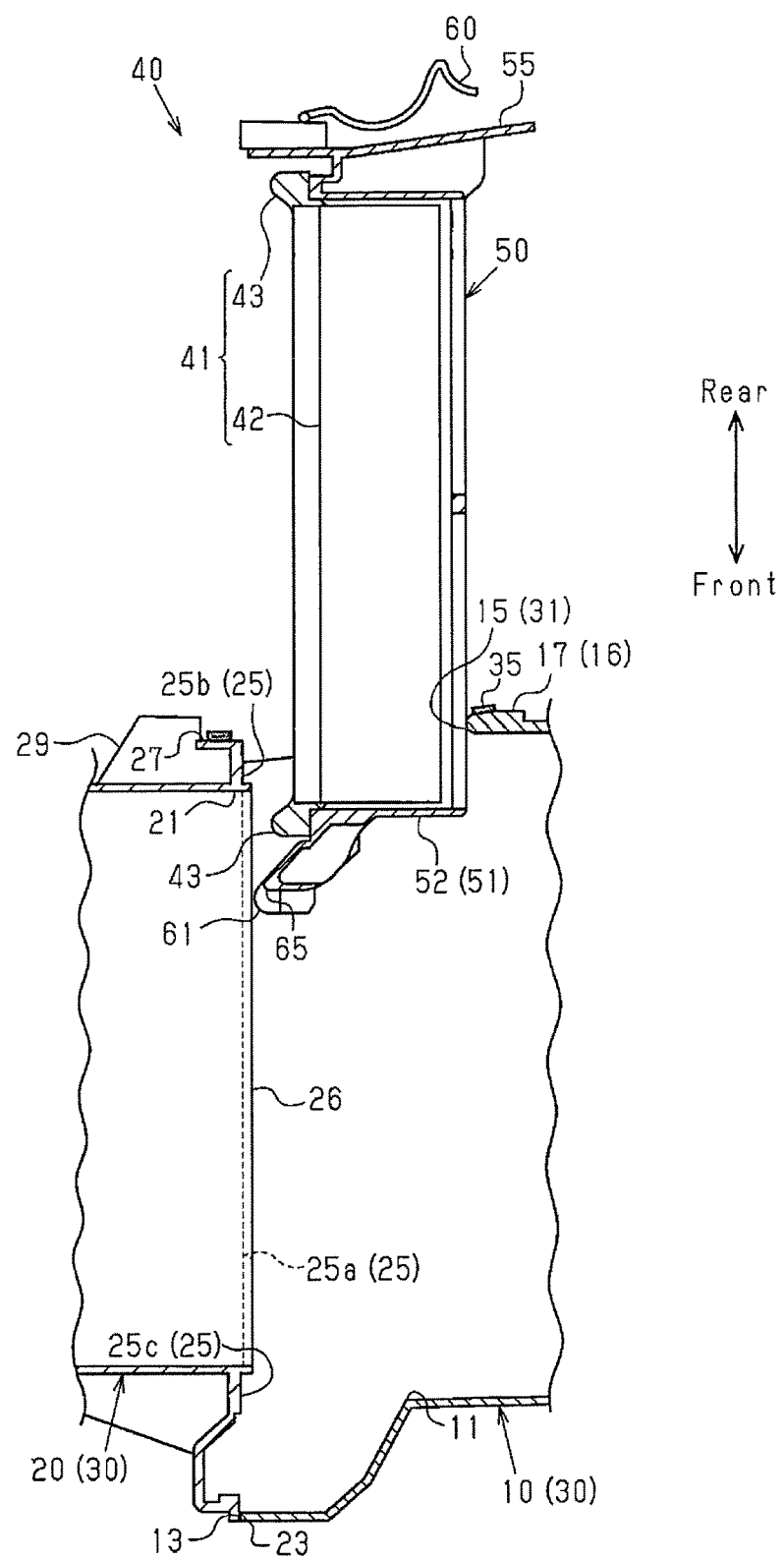
FIG. 4 is a cross-sectional view illustrating a state in which the filter assembly is being inserted into the housing.

As shown in FIGS. 1, 2, and 4, an air cleaner is provided in the intake passage of an internal combustion engine of a vehicle and includes a housing 30 and a filter assembly 40. The housing 30 has an opening 31 at the top. The opening 31 has a rectangular shape in a plan view. The filter assembly 40 is installed in and removed from the housing 30 through the opening 31. In the following description, the leading side and the trailing side in the direction in which the filter assembly 40 is inserted through the opening 31 will be referred to as a front side and a rear side (the bottom side and the top side as viewed in FIG. 1). The axis along the long sides of the opening 31 will be referred to as a longitudinal axis L.

The housing 30 includes a first housing member 10 and a second housing member 20, which are made of a hard plastic.

As shown in FIG. 1, the first and second housing members 10, 20 have open ends 11, 21 and joint portions 13, 23 provided at the peripheries of the open ends 11, 21, respectively. The housing 30 is formed by welding the joint portions 13, 23 to each other.

<First Housing Member 10>

As shown in FIG. 1, the first housing member 10 includes a peripheral wall 12 with a cylindrical inlet 14 protruding outward.

As shown in FIGS. 1, 2, and 4, the first housing member 10 has a recess 15 at the rear edge of the open end 11. The recess 15 and the rear edge of the open end 21 of the second housing member 20 define the opening 31. The first housing member 10 has an installation seat 17 formed on an edge 16 of the recess 15. The entire edge 16 protrudes rearward to form the installation seat 17. The installation seat 17 is U-shaped in a plan view.

As shown in FIG. 1, the first housing member 10 includes two projections 18, which are located on the inner surface of the front peripheral wall 12. The projections 18 project toward the second housing member 20, or leftward as viewed in FIG. 1. Although not illustrated, the projections 18 are spaced apart from each other along the longitudinal axis L in the present embodiment. The distal end of each projection 18 extends along the longitudinal axis L.

<Second Housing Member 20>

As shown in FIGS. 1 and 2, the second housing member 20 includes a peripheral wall 22 with a cylindrical outlet 24 protruding outward.

As shown in FIGS. 1 and 4, the second housing member 20 has a rectangular loop-shaped sealing surface 25 on the edge of the open end 21. The sealing surface 25 has two sections 25a that extend in the direction of insertion of the filter assembly 40 (the up-down direction as viewed in FIGS. 1 and 4). A protrusion 26 is formed on the inner edge of each of the sections 25a. Each protrusion 26 protrudes to be closer to the filter assembly 40 than the sealing surface 25 (rightward as viewed in FIGS. 1 and 4) and is formed over the entire section 25a in the insertion direction.

The sealing surface 25 has a section 25b that extends along the longitudinal axis L and is located at the rear edge (the upper edge as viewed in FIGS. 1 and 4). An installation seat 27 is formed on the rear edge of the section 25b over the entire section 25b along the longitudinal axis L. The installation seat 27 extends to be spaced apart from the first housing member 10 (leftward as viewed in FIGS. 1 and 4).

As shown in FIGS. 1, 2, and 4, the installation seat 17 of the first housing member 10 and the installation seat 27 of the second housing member 20 form a rectangular loop shape as a whole. A rectangular loop-shaped noise absorbing member 35 is bonded to the installation seats 17, 27 with double-sided tape. The noise absorbing member 35 is made of, for example, polyurethane sponge.

As shown in FIG. 1, the sealing surface 25 has a section 25c that extends along the longitudinal axis L and is located at the front side (the bottom side as viewed in FIG. 1). A securing portion 28 is formed on the section 25c.

As shown in FIGS. 1, 2, and 4, the second housing member 20 has two clamp securing portions 29 on the rear peripheral wall 22. The clamp securing portions 29 protrude to be spaced apart from each other along the longitudinal axis L.

<Filter Assembly 40>

As shown in FIGS. 1, 2, and 4, the filter assembly 40 includes a substantially rectangular parallelepiped-shaped filter element 41 and a frame 50, which supports the filter element 41.

The filter element 41 includes a filtering portion 42, which is formed by pleating a filtering medium sheet of, for example, filter paper or nonwoven fabric. A rectangular loop-shaped sealing portion 43 is formed over the entire outer periphery on the downstream side of the filtering portion 42. The sealing portion 43 is formed of closed-cell polyurethane resin.

As shown in FIG. 2, the frame 50 includes a frame body 51, which accommodates and supports the filter element 41. The frame body 51 includes a rectangular tube-shaped peripheral wall 52 and a cross-shaped coupling portion 53. The peripheral wall 52 surrounds the outer periphery of the filtering portion 42 of the filter element 41. The coupling portion 53 is located on the side opposite to the side contacting the sealing portion 43 at the peripheral wall 52. The coupling portion 53 couples, to each other, inner surfaces of the peripheral wall 52 that face each other.

Figure 3:
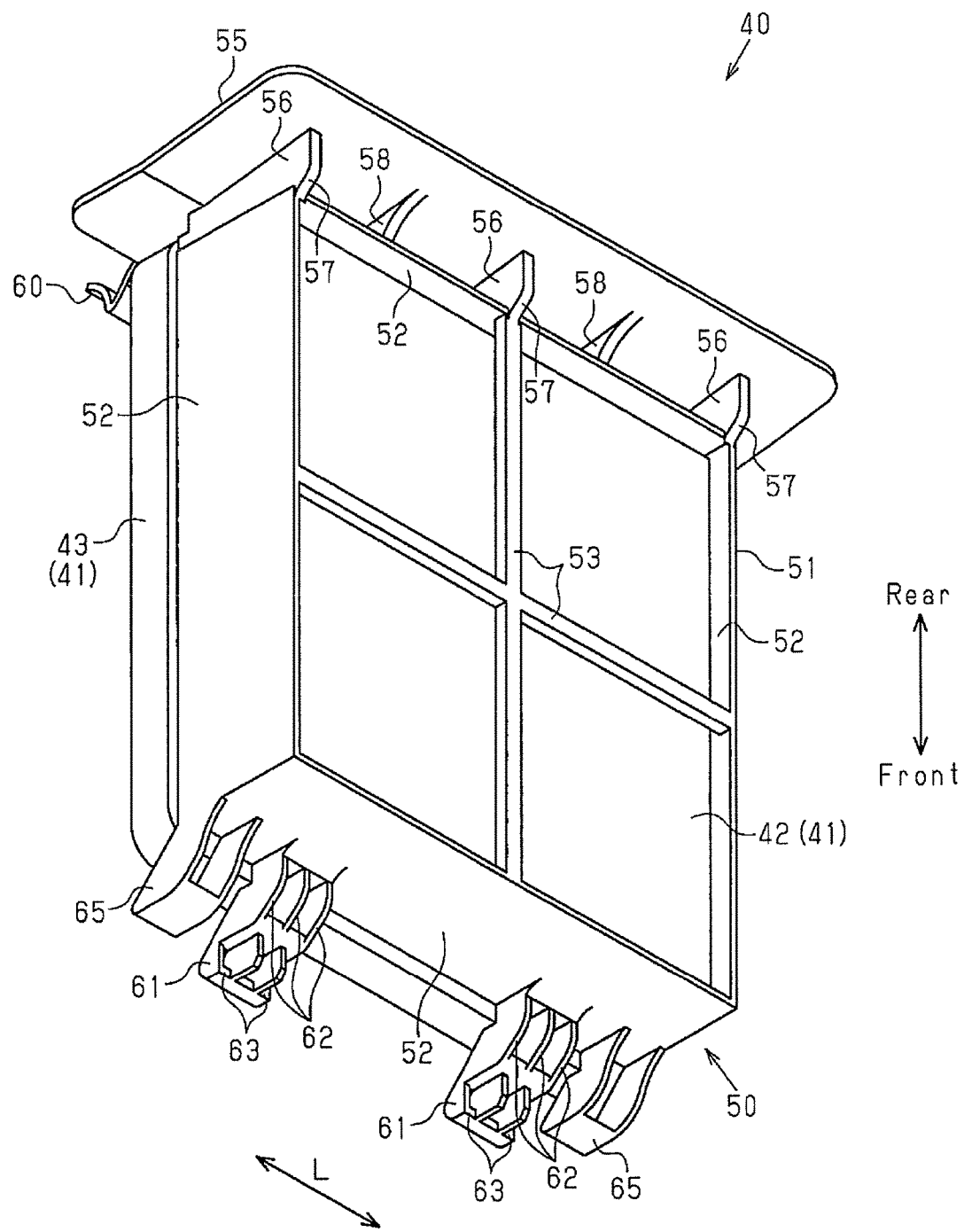
FIG. 3 is a perspective view illustrating a filter assembly.

As shown in FIGS. 2 and 3, two outer projections 65 are formed on the front side of the peripheral wall 52. The outer projections 65 are formed on the front side at the opposite ends on the longitudinal axis L, that is, at the positions corresponding to the protrusions 26 of the second housing member 20.

As shown in FIG. 4, the outer projections 65 project further forward than the front side of the peripheral wall 52 and are closer to the second housing member 20 than the sealing portion 43 (leftward as viewed in FIG. 4). The cross-sectional area of the distal portion of each outer projection 65 decreases toward the second housing member 20.

As shown in FIGS. 2 and 3, two inner projections 61 are formed on the front side of the peripheral wall 52 of the frame body 51. The inner projections 61 are located on the inner sides of the outer projections 65 along the longitudinal axis L.

As shown in FIG. 1, the inner projections 61 project further forward than the front side of the peripheral wall 52 and are closer to the second housing member 20 than the outer projections 65 (leftward as viewed in FIG. 1).

As shown in FIGS. 1 and 3, the inner projections 61 have hook portions 63, which are engaged with the securing portions 28 of the second housing member 20.

As shown in FIG. 1, when the filter assembly 40 is installed in the housing 30 (that is, at an installation position), the hook portions 63 are closer to the second housing member 20 than the distal ends of the securing portions 28 of the second housing member 20 and contact the securing portions 28 to be engaged with the securing portions 28. The sealing portion 43 is pressed against the sealing surface 25 of the second housing member 20 over the entire periphery.

As shown in FIGS. 1 and 3, each inner projection 61 has a front engaging portion 62 at a position close to the first housing member 10. The front engaging portion 62 is inclined to be closer to the second housing member 20 toward the front end.

As shown in FIGS. 1 to 4, the frame 50 has a lid plate 55 on the rear side of the frame body 51. The lid plate 55 closes the opening 31 of the housing 30.

As shown in FIG. 3, the frame 50 includes ribs 56, 58, the total number of which is five in the present embodiment, between the rear side of the frame body 51 and the lid plate 55 to connect the frame body 51 to the lid plate 55. The ribs 56, 58 are arranged to be spaced apart from each other along the longitudinal axis L. Of the ribs 56, 58, the ribs 56 are located at the center and the opposite ends on the longitudinal axis L of the frame body 51. Each of the ribs 56 has at the upstream edge a rear engaging portion 57, which is inclined to be closer to the sealing surface 25 of the second housing member 20 toward the front end.

As shown in FIGS. 1 to 4, the frame 50 has two clamps 60 on the outer surface of the lid plate 55. The clamps 60 are spaced apart from each other along the longitudinal axis L.

As shown in FIG. 1, the clamps 60 are engaged with the clamp securing portions 29 of the second housing member 20, so that the filter assembly 40 is fastened to the housing 30. At this time, the lid plate 55 is pressed against the noise absorbing member 35. This limits leaking of intake noise from the air cleaner.

Operation of the present embodiment will now be described.

FIG. 4 illustrates the filter assembly 40 being inserted into the housing 30 through the opening 31. In this state, even if the filter assembly 40 is inclined, the outer projections 65 contact the protrusions 26 before the sealing portion 43 contacts the protrusions 26. Accordingly, the sealing portion 43 is prevented from contacting the protrusions 26.

Figure 5:
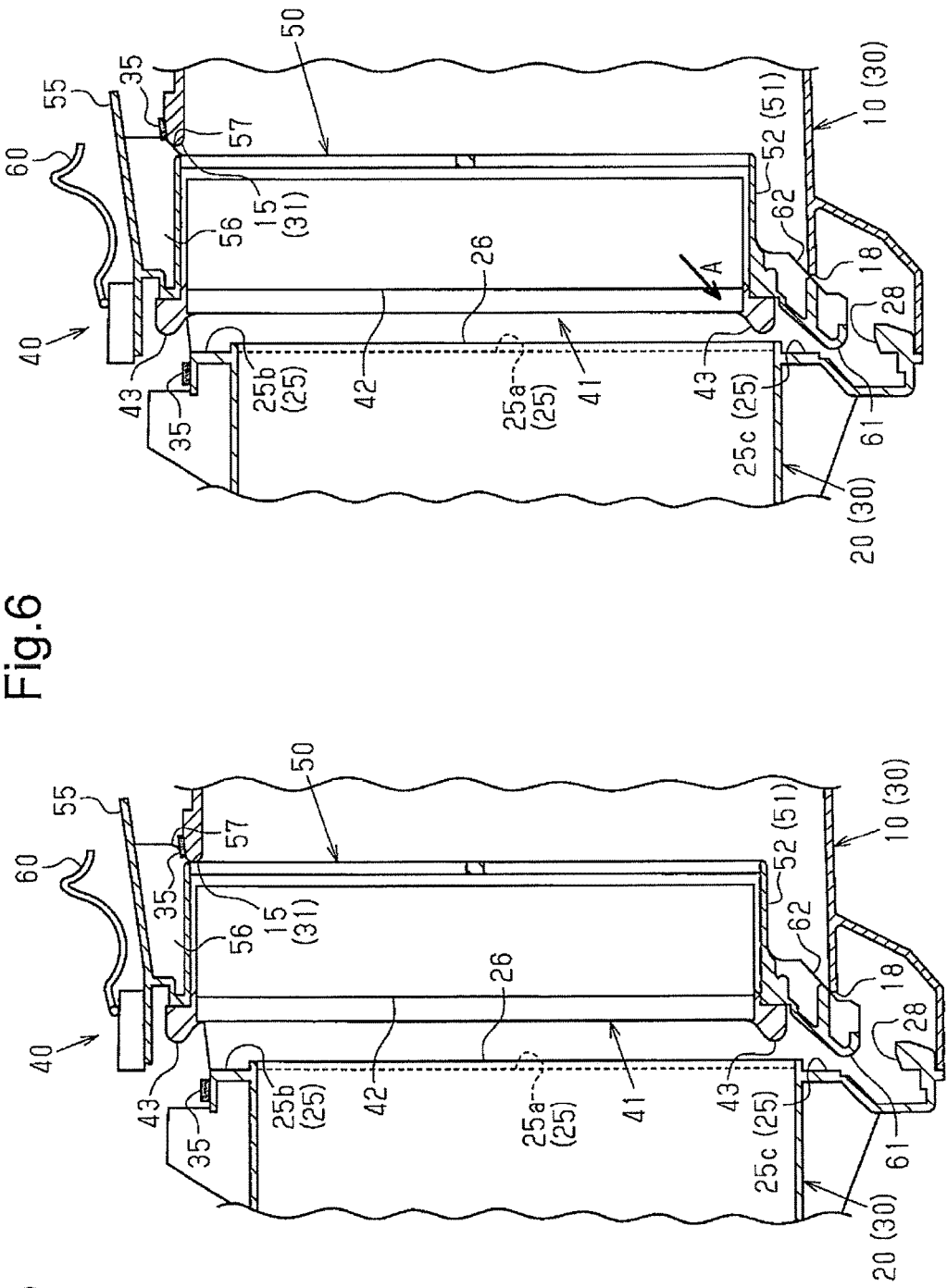
FIG. 5 is a cross-sectional view illustrating a state in which front engaging portions of inner projections of the frame are in contact with protrusions of the housing.

When the filter assembly 40 is inserted as shown in FIG. 5, the front engaging portions 62 of the frame 50 contact the distal ends of the projections 18 of the first housing member 10 (the left ends as viewed in FIG. 5).

Figure 6:
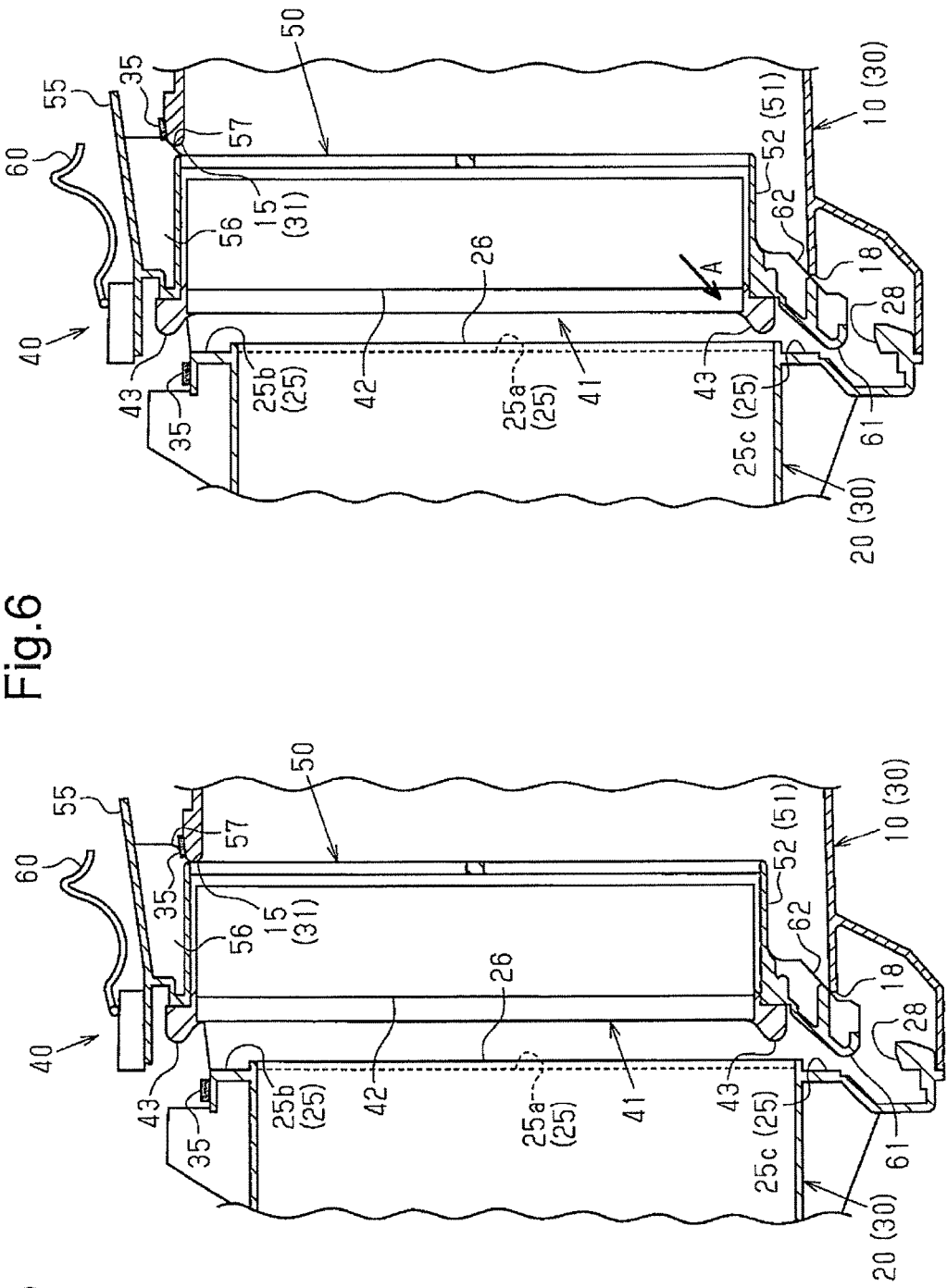
FIG. 6 is a cross-sectional view illustrating a state in which the filter assembly is being guided to the installation position along the front engaging portions of the inner projections of the frame.

When the filter assembly 40 is inserted further while maintaining the engagement between the front engaging portions 62 and the distal ends of the projections 18, the filter assembly 40 is guided toward the installation position in the inclination direction A of the front engaging portions 62 as shown in FIG. 6. At this time, the rear engaging portions 57 of the frame 50 are engaged with the edge 16 of the opening 31. This guides the filter assembly 40 toward the installation position while being supported at the front part and the rear part in the insertion direction. Thus, the front engaging portions 62 and the projections 18 constitute a guiding structure for guiding the filter assembly 40 to the installation position. The rear engaging portions 57 and the edge 16 also constitute a guiding structure for guiding the filter assembly 40 to the installation position.

When the filter assembly 40 is inserted to the installation position as shown in FIG. 1, the sealing portion 43 of the filter element 41 is pressed against the sealing surface 25 of the second housing member 20. When the clamps 60 are engaged with the clamp securing portions 29, the installation of the filter assembly 40 is completed.

The air cleaner according to the above described embodiment has the following advantages.

(1) The frame 50 includes the frame body 51, which supports the filter element 41, and the front engaging portions 62 (the inner projections 61), which project further forward than the frame body 51 in the insertion direction. The first housing member 10 includes front engagement portions (the projections 18), which are engaged with the front engaging portions 62 during insertion of the filter assembly 40. The front engaging portions 62 and the projections 18 are engaged with each other to constitute a guiding structure for guiding the filter assembly 40 to the installation position.

With this configuration, the front engaging portions 62 of the frame 50 project further forward in the insertion direction than the frame body 51. Thus, unlike the conventional configuration, the frame body 51 does not need to have projections on the side opposite to the sealing portion 43. This reliably prevents the thickness of the frame body 51 from increasing due to addition of engaging portions. Therefore, the width W of the opening 31 of the housing 30 is not increased.

(2) The front engaging portions 62 are inclined to be closer to the sealing surface 25 toward the front end in the insertion direction, and the front engagement portions (the projections 18) project from the inner wall of the first housing member 10.

With this configuration, the filter assembly 40 is smoothly guided to the installation position by engaging the front engaging portions 62 with the projections 18 projecting from the inner wall of the first housing member 10. Also, the front engagement portions, with which the inner projections 61 are engaged, are realized by a simple change of design, which is forming of the projections 18 on the inner wall of the first housing member 10.

(3) The frame 50 includes the inner projections 61, which projects further forward in the insertion direction than the frame body 51 and has the hook portions 63. When the filter assembly 40 is at the installation position, the hook portions 63 are hooked to the securing portions 28 of the second housing member 20. The inner projections 61 are formed on the front engaging portions 62.

Thus, the frame 50 does not need to have any additional engaging portions. This prevents the structure of the frame 50 from being complicated.

(4) The frame 50 includes the outer projections 65, which are located in front of the frame body 51 in the insertion direction and closer to the sealing surface 25 than the sealing portion 43. During insertion of the filter assembly 40, the outer projections 65 contact the protrusions 26.

With this configuration, the outer projections 65 prevent the sealing portion 43 from contacting the protrusions 26. The sealing portion 43 is thus not damaged by contacting the protrusions 26. The sealing performance therefore will not be degraded due to damages to the sealing portion 43.

(5) The ribs 56, which connect the frame body 51 and the lid plate 55 to each other, are provided between the frame body 51 and the lid plate 55. Each rib 56 includes a rear engaging portion 57, which projects further rearward in the insertion direction than the frame body 51. The rear engaging portion 57 is inclined to be closer to the sealing surface 25 toward the front end in the insertion direction and is engaged with the edge 16 of the opening 31.

This configuration guides the filter assembly 40 toward the installation position while being supported at the front part and the rear part in the insertion direction. Thus, the orientation of the filter assembly 40 is properly maintained while being guided to the installation position.

Also, this configuration allows the rear engaging portions 57 of the ribs 56 to engage with the edge 16 of the opening 31, so that the filter assembly 40 is smoothly guided to the installation position. Thus, the first housing member 10 does not need to have any additional engagement portions. This prevents the structure of the first housing member 10 from being complicated.

Since each rear engaging portion 57 is constituted by part of a rib 56, which connects the frame body 51 and the lid plate 55 to each other, the frame 50 does not need to have any additional engaging portions. This prevents the structure of the frame 50 from being complicated.

<Modifications>

The above described embodiments may be modified as follows.

Rear engaging portions may be provided separately from the ribs 56. Rear engagement portions may be provided separately from the edge 16 of the opening 31. The rear engaging portions and the rear engagement portions may be omitted.

Figure 7:
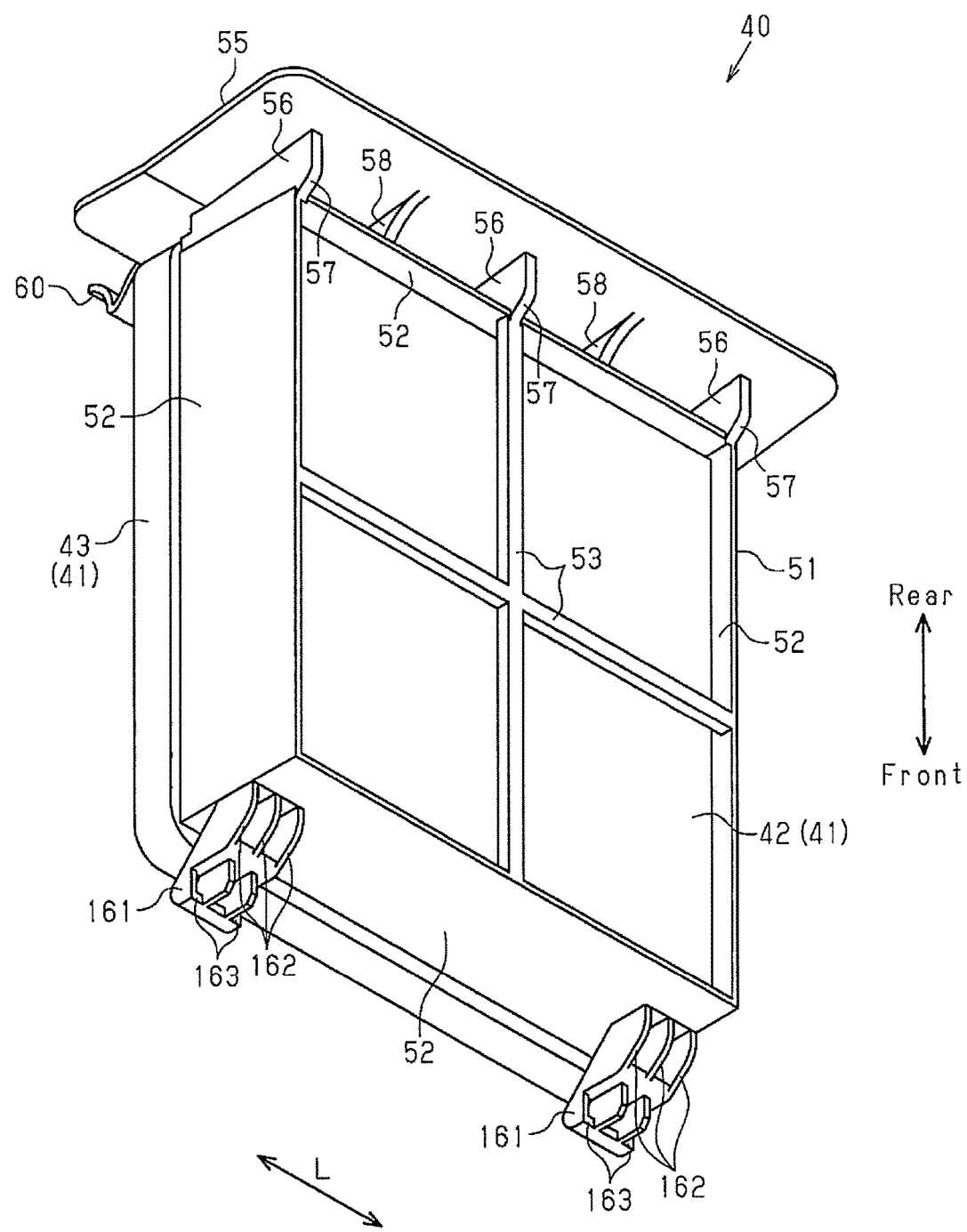
FIG. 7 is a perspective view illustrating a filter assembly for an air cleaner according to a modification.

In the above illustrated embodiment, the inner projections 61 and the outer projections 65 are provided separately. However, as shown in FIG. 7, the projections 61, 65 may be omitted, and projections 161, which have the functions of both the projections 61, 65, may be provided at the positions of the outer projections 65. The projections 161 are located in front of the frame body 51 and closer to the sealing surface 25 than the sealing portion 43. During insertion of the filter assembly 40, the projections 161 contact the protrusions 26. Each projection 161 has a shape similar to that of the inner projection 61 in the above illustrated embodiment and includes a front engaging portion 162 and a hook portion 163. Each front engaging portion 162 has a shape similar to that of the inner projection 61 of the above illustrated embodiment. If the projections 161 are provided, the positions of the projections 18 of the first housing member 10 and the positions of the securing portions 28 of the second housing member 20 may be changed in accordance with the positions of the projections 161. In this case, the number of the projections 161 can be reduced to half the number of the projections of the frame 50 of the above illustrated embodiment.

In the above illustrated embodiment and the modification, each engaging portion of the frame is inclined to be closer to the sealing surface 25 toward the front end. However, the engagement portions of the housing may be inclined to be closer to the sealing surface toward the front end.

The invention claimed is:

1. An air cleaner comprising:
a housing having an opening; and
a filter assembly having a filter element and a frame, which supports the filter element, wherein
the filter assembly is installed in and removed from the housing of the air cleaner through the opening,
when the filter assembly is at an installation position, a sealing portion of the filter element is pressed against a sealing surface of the housing,
a direction along the sealing surface, in which the filter assembly is inserted into the housing through the opening, is defined as an insertion direction,
the frame includes
a frame body, which supports the filter element, and
an engaging portion, which projects further forward in the insertion direction than the frame body,
the housing includes an engagement portion, which is engaged with the engaging portion during insertion of the filter assembly, and
the engaging portion and the engagement portion are engaged with each other to constitute a guiding structure that guides the filter assembly toward the installation position.

2. The air cleaner according to claim 1, wherein
the engaging portion is inclined to be closer to the sealing surface toward a front end in the insertion direction, and
the engagement portion projects from an inner wall of the housing.

3. The air cleaner according to claim 2, wherein
the frame includes a projection, which projects further forward in the insertion direction than the frame body,
the projection includes a hook portion, which is engaged with a securing portion of the housing when the filter assembly is at the installation position, and
the engaging portion is formed in the projection.

4. The air cleaner according to claim 3, wherein
the projection is an inner projection,
a protrusion is formed on an inner edge of the sealing surface of the housing,
the protrusion protrudes to be closer to the filter assembly than the sealing surface and extends in the insertion direction,
the frame includes an outer projection,
the outer projection projects further forward in the insertion direction than the frame body and is closer to the sealing surface than the sealing portion, and
the outer projection is configured to contact the protrusion when the filter assembly is inserted.

5. The air cleaner according to claim 3, wherein
a protrusion is formed on an inner edge of the sealing surface of the housing,
the protrusion protrudes to be closer to the filter assembly than the sealing surface and extends in the insertion direction,
the projection projects further forward in the insertion direction than the frame body and is closer to the sealing surface than the sealing portion, and
the projection is configured to contact the protrusion when the filter assembly is inserted.

6. The air cleaner according to claim 1, wherein
the engaging portion is a front engaging portion,
the engagement portion is a front engagement portion,
the frame includes a rear engaging portion, which projects further rearward in the insertion direction than the frame body,
the housing includes a rear engagement portion, which is engaged with the rear engaging portion during insertion of the filter assembly, and
the rear engaging portion and the rear engagement portion are engaged with each other to constitute a guiding structure that guides the filter assembly toward the installation position.

7. The air cleaner according to claim 6, wherein
the rear engagement portion is constituted by an edge of the opening, and
the rear engaging portion projects further rearward in the insertion direction than the frame body and is inclined to be closer to the sealing surface toward a front end in the insertion direction.

8. The air cleaner according to claim 7, wherein
the frame includes a lid plate, which closes the opening,
a rib is provided between the frame body and the lid plate to connect the frame body and the lid plate to each other, and
the rear engaging portion is formed on the rib.

* * * * *